(12) United States Patent
Nakabayashi et al.

(10) Patent No.: US 8,911,901 B2
(45) Date of Patent: *Dec. 16, 2014

(54) NEGATIVE ELECTRODE FOR NON-AQUEOUS SECONDARY BATTERY AND NON-AQUEOUS SECONDARY BATTERY

(75) Inventors: Takashi Nakabayashi, Hitachi (JP); Shin Takahashi, Mito (JP)

(73) Assignee: Hitachi, Ltd., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 13/372,637

(22) Filed: Feb. 14, 2012

(65) Prior Publication Data

US 2012/0219858 A1   Aug. 30, 2012

(30) Foreign Application Priority Data

Feb. 28, 2011 (JP) ................................. 2011-041108

(51) Int. Cl.
| | |
|---|---|
| *H01M 4/38* | (2006.01) |
| *H01M 4/134* | (2010.01) |
| *H01M 4/04* | (2006.01) |
| *H01M 4/1395* | (2010.01) |
| *H01M 4/62* | (2006.01) |
| *H01M 10/0525* | (2010.01) |
| *H01M 4/02* | (2006.01) |

(52) U.S. Cl.
CPC ............ *H01M 4/134* (2013.01); *H01M 4/0471* (2013.01); *H01M 4/0483* (2013.01); *H01M 4/1395* (2013.01); *H01M 4/386* (2013.01); *H01M 4/622* (2013.01); *H01M 4/387* (2013.01); *Y02E 60/122* (2013.01); *H01M 10/0525* (2013.01); *H01M 2004/021* (2013.01); *H01M 2004/027* (2013.01)
USPC ........ 429/218.1; 429/219; 429/221; 429/224; 429/231.8; 429/129

(58) Field of Classification Search
USPC ....................... 429/219, 231.8, 129, 224, 221
See application file for complete search history.

(56) References Cited

U.S. PATENT DOCUMENTS

2004/0043294 A1   3/2004   Fukui et al.
(Continued)

FOREIGN PATENT DOCUMENTS

CN           101180753 A        5/2008
(Continued)

OTHER PUBLICATIONS

Liu et al., "Synthesis and Chracterization of Nanoporous NiSi-Si Composite Anode for Lithium-Ion Batteries", *Journal of the Electrochemical Society*; 154 (2) A97-A102 (2007).
(Continued)

*Primary Examiner* — Mark F Huff
*Assistant Examiner* — Olatunji Godo
(74) *Attorney, Agent, or Firm* — Antonelli, Terry, Stout & Kraus, LLP.

(57) ABSTRACT

The object of the present invention is to inhibit occurrence of structural collapse caused by volumetric change of primary particles of negative electrode active material and to improve adhesion between negative electrode active material and electrically conductive agent and between negative electrode mix layer and collector, whereby improvement of life is attained in negative electrode for non-aqueous secondary battery and non-aqueous secondary battery. In the negative electrode for non-aqueous secondary battery of the present invention, the negative electrode active material comprises silicon and/or tin, and at least one element selected from elements which do not react with lithium and has pores in both of the inner core portion and the outer peripheral portion of primary particles and a material which cures by a heat treatment is used as a binder.

17 Claims, 7 Drawing Sheets

(56) References Cited

U.S. PATENT DOCUMENTS

| | | | |
|---|---|---|---|
| 2004/0214085 A1* | 10/2004 | Sheem et al. | 429/218.1 |
| 2007/0020521 A1 | 1/2007 | Obrovac et al. | |
| 2009/0269669 A1* | 10/2009 | Kim et al. | 429/231.8 |
| 2010/0323242 A1* | 12/2010 | Choi et al. | 429/217 |
| 2011/0294012 A1* | 12/2011 | Nakabayashi et al. | 429/218.1 |

FOREIGN PATENT DOCUMENTS

| | | | |
|---|---|---|---|
| CN | 101572312 A | | 11/2009 |
| EP | 1 873 846 A1 | | 1/2008 |
| EP | 1873846 A1 | * | 1/2008 |
| JP | 2001-185152 | | 7/2001 |
| JP | 2002-260637 | | 9/2002 |
| JP | 2004-22512 | | 1/2004 |
| JP | 2004-87264 | | 3/2004 |
| JP | 2004-214054 | | 7/2004 |
| JP | 2005-197096 | | 7/2005 |
| JP | 2006-236835 | | 9/2006 |
| JP | 2007-165061 | | 6/2007 |
| JP | 2007-242405 | | 9/2007 |
| JP | 2008-16446 | | 1/2008 |
| JP | 2009-32644 | | 2/2009 |
| JP | 2009-164104 | | 7/2009 |
| JP | 2009-252580 | | 10/2009 |
| KR | 10-2004-0063802 | | 7/2004 |
| KR | 10-2008-0031323 | | 4/2008 |
| WO | WO 02/21616 | | 3/2002 |
| WO | WO 2007/014015 | | 2/2007 |
| WO | WO 2010/035919 | * | 4/2010 |

OTHER PUBLICATIONS

Communication mailed Jul. 2, 2013, in connection with Japanese Patent Application No. 2011-041108, 2 pages; Japanese Patent Office, Japan.

Communication mailed Jul. 24, 2013, in connection with Korean Patent Application No. 10-2012-0015649, 5 pages; Korean Intellectual Property Office, Republic of Korea.

Office Action mailed on Dec. 4, 2013, in connection with Chinese Patent Application No. 201210035720.2; 5 pages.

Communication mailed Jul. 8, 2014, in connection with Chinese Patent Application No. 201210035720.2, 8 pages; China.

Communication mailed Jan. 28, 2014, in connection with Korean Patent Application No. 10-2012-0015649, 5 pages; Korea.

Foreign language translation of communication mailed Jan. 28, 2014, in connection with Korean Patent Application No. 10-2012-0015649.

* cited by examiner

NEGATIVE ELECTRODE FOR NON-AQUEOUS SECONDARY BATTERY AND NON-AQUEOUS SECONDARY BATTERY

BACKGROUND OF THE INVENTION

The present invention relates to a negative electrode for non-aqueous secondary battery and a non-aqueous secondary battery.

As non-aqueous secondary batteries, there have been put to practical use lithium ion secondary batteries which use a non-aqueous electrolyte and use lithium ion for charge and discharge reaction. The lithium ion secondary batteries are higher in energy density as compared with nickel metal hydride batteries and the like, and are used as secondary batteries for power sources of portable electronic equipments. However, the lithium ion secondary batteries as power sources are required to be higher in capacity and smaller in size with the recent portable electronic equipments becoming higher in capacity and smaller in size. For meeting the requirement, it is essential to increase the capacity of negative electrodes.

At present, carbon materials are used for negative electrode active materials used in negative electrodes, and lithium ion is occluded/released by intercalation/deintercalation of lithium ion between grapheme layers, and the theoretical capacity thereof is 372 Ah/kg. However, remarkable increase of capacity cannot be expected because actual capacity close to theoretical capacity has been realized for carbon materials. Therefore, substitutes for carbon materials are vigorously searched and high capacity can be expected. A high interest centers around alloy negative electrodes (or metal negative electrodes) which carry out charge and discharge reaction by alloying/dealloying reaction as shown in the formula of $xLi^+ + M + xe^- \Leftrightarrow Li_xM$ (M indicates a metal). For example, silicon has a theoretical capacity of 4200 Ah/kg and tin has a theoretical capacity of 990 Ah/kg which are several times—10 times the theoretical capacity of carbon materials.

However, it has been known that the alloy negative electrodes are greater than carbon materials in volume change caused by charge and discharge reaction, and silicon expands to 420% and tin expands to 360% at the time of alloying of lithium ion, and the structure of battery container cannot be maintained due to the stress caused by the great volume change with charging and discharging, resulting in cycle characteristics inferior to those of carbon materials and thus improvement in this respect is required.

Under the circumstances, the following Patent Document 1 proposes that the structure of battery container is maintained and cycle characteristics are improved by alloying with a matrix component which does not react with lithium ion, but the cycle characteristics are still inferior and the negative electrodes could not be put to practical use.

In the following Patent Documents 2-8, it is proposed to use a material containing an imide compound as a binder. Patent Document 2 proposes that adhesion between a negative electrode mix layer and a collector is improved by using a material containing an imide compound as a binder of negative electrode, and that pores are formed in the negative electrode mix layer for preparing a binder by decomposing a binder precursor by heat treatment, thereby to relax the stress caused by expansion and contraction of negative electrode active material particles. However, since the negative electrode active material per se has no pores, the structure of the negative electrode active material per se is broken to cause deterioration of cycle characteristics.

Further, the following Patent Document 9 proposes a method of decreasing the volume change by a porous body having pores comprising a continuous solid produced by plating a foamed metal with a metal element alloying with lithium ion to inhibit collapse of the structure, but according to this method, the pore diameter is large, resulting in low strength that is not preferred.

The following Patent Document 10 proposes to improve cycle characteristics by forming voids in a porous particle comprising only silicon to prevent apparent changes in volume. However, since the negative electrode comprises only silicon and contains no matrix component, relaxation of stress caused by charging and discharging is insufficient, and besides low conductivity is brought about, that is not preferred.

Patent Document 1: JP-A-2009-032644
Patent Document 2: JP-A-2007-242405
Patent Document 3: JP-A-2009-252580
Patent Document 4: JP-A-2009-164104
Patent Document 5: JP-A-2008-016446
Patent Document 6: JP-A-2007-165061
Patent Document 7: JP-A-2005-197096
Patent Document 8: JP-A-2001-185152
Patent Document 9: JP-A-2004-022512
Patent Document 10: JP-A-2004-214054

SUMMARY OF THE INVENTION

An object of the present invention is to reduce stresses generated and inhibit extension of cracks of primary particles of the negative electrode active material by suppressing volume change of primary particles of negative electrode active material. Another object is to improve adhesion between negative electrode active material and electrically conductive agent and between negative electrode mix layer and collector. Thus, the present invention aims at improvement in cycle characteristics.

Figure 1:
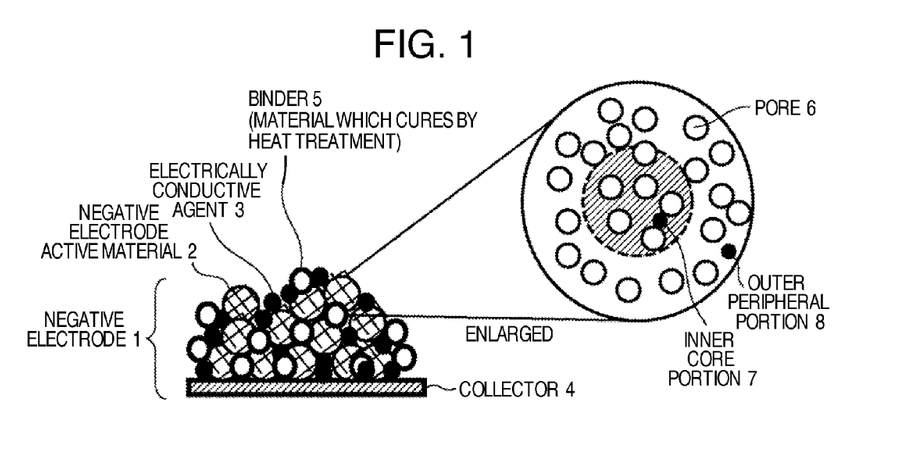
FIG. 1 is a conceptual view of the negative electrode of the present invention.

The negative electrode for non-aqueous secondary battery according to the present invention is characterized in that the negative electrode active material comprises at least one selected from the group consisting of silicon and tin, and at least one element selected from the elements which do not react with lithium, and has pores in both the inner core portion and the outer peripheral portion in the primary particles, and the binder is a material containing a material which cures by a heat treatment. As shown in FIG. 1, both of the inner core portion and the outer peripheral portion comprise at least one selected from the group consisting of silicon and tin, and at least one element selected from the elements which do not react with lithium, and the elements which do not react with lithium function as a component for maintaining structure, whereby structural collapse can be inhibited. Furthermore, since both of the inner core portion and the outer peripheral portion in the primary particles have pores, the volume changes caused by charge and discharge reaction are absorbed by the pores and can be relaxed by the whole primary particles, and the pores inhibit extension of cracks, thereby preventing structural collapse. Moreover, the negative electrode active material and the electrically conductive agent can be firmly fixed on the collector by using a material which cures by heat treatment as a binder. As a result, there can be provided negative electrodes having a high capacity and excellent cycle characteristics.

Furthermore, the negative electrode for non-aqueous secondary battery according to the present invention is characterized in that the binder is a material containing an imide compound. Adhesion between the negative electrode active material and the electrically conductive agent and between the negative electrode mix layer and the collector can be improved by using the material containing an imide compound as a binder.

The negative electrode for non-aqueous secondary battery according to the present invention is further characterized in that the negative electrode active material comprises tin and at least one element selected from the elements which do not react with lithium. Since the negative electrode active material comprises tin and at least one element selected from the elements which do not react with lithium, pores can be formed by melt quenching method.

The negative electrode for non-aqueous secondary battery according to the present invention is further characterized in that the negative electrode active material comprising tin and at least one element selected from the elements which do not react with lithium, and having pores in both of the inner core portion and the outer peripheral portion in the primary particles has a tin content of not more than 85% by weight. When the content of tin is not more than 85% by weight, the pores can be maintained even if the heat treatment (curing treatment) carried out for curing the binder is conducted at high temperatures (higher than 300° C.), and the heat treatment can be performed in a short time, that is preferred. When the content of tin is not more than 35% by weight, the resulting capacity is similar to that obtained using carbon materials.

The negative electrode for non-aqueous secondary battery according to the present invention is further characterized in that the element which does not react with lithium in the negative electrode active material is vanadium, chromium, manganese, iron, cobalt, nickel, copper, zinc, silver, gold, indium, titanium or zirconium. The negative electrode active material becomes higher in electric conductivity by using vanadium, chromium, manganese, iron, cobalt, nickel, copper, zinc, silver, gold, indium, titanium or zirconium, that is preferred.

The present invention is further characterized in that the pores have an average pore diameter of not more than 2 µm. By using the average pore diameter of not more than 2 µm, the number of pores which inhibit extension of cracks can be increased. When the average pore diameter is not more than 0.01 µm, the electrolyte does not penetrate to cause decrease of capacity.

The present invention is further characterized in that the degree of dispersion which is a value obtained by dividing a standard deviation of distance between centers of gravity of the pores by an average value of distance between centers of gravity of the pores is 1 or less. In this case, pores which inhibit extension of cracks are uniformly distributed in the negative electrode active material, and hence the structural collapse can be prevented. Moreover, since distribution of the pores is uniform, uneven distribution of stress can be avoided.

The present invention is further characterized in that the average distance between the pores is not more than 3 µm. The extension of cracks can be inhibited by employing an average distance between the pores of not more than 3 µm. On the other hand, when it is not more than 0.01 µm, the portion comprising at least one selected from the group consisting of silicon and tin, and at least one element selected from elements which do not react with lithium becomes too small as compared with the pore diameter, resulting in deterioration of strength of the primary particles of the negative electrode active material, that is not preferred.

The present invention is further characterized in that porosity of the pores is not less than 5%. If the porosity is less than 5%, volume change cannot be inhibited. If the porosity exceeds 80%, the strength decreases and the cycle characteristics tend to deteriorate.

The present invention is further characterized in that the average particle diameter of the negative electrode active material is not more than 50 µm. When the average particle diameter is not more than 50 µm, the absolute quantity of volume change can be controlled. If it is not less than 0.1 µm, specific surface area does not become too large, and occurrence of the side reaction with electrolyte can be inhibited, that is preferred.

The present invention is further characterized in that the negative electrode active material having pores is produced by melt quenching method. The pores are formed by using the melt quenching method. Moreover, crystallite diameter becomes fine, that is preferred.

The present invention is further characterized in that the negative electrode active material having pores is produced by a single-roll method. Super rapid cooling can be performed by employing the single-roll method, and crystallite diameter and pore diameter become fine, that is preferred.

The present invention is further characterized in that the heat treating temperature is not higher than 200° C. When the negative electrode having the negative electrode active material comprising tin and at least one element selected from elements which do not react with lithium, having pores in both of the inner core portion and the outer peripheral portion in the primary particles, and having a tin content of not less than 85% by weight is heat treated at a high temperature (300° C. or higher), the pores disappear, while the pores can be maintained by carrying out the heat treatment at 200° C. or lower. Thus, increase of tin content can result in high capacity, that is preferred.

The non-aqueous secondary battery of the present invention is characterized by using the above negative electrode for non-aqueous secondary battery. A secondary battery of high capacity and long life can be provided by using this negative electrode for non-aqueous secondary battery.

The negative electrode for non-aqueous secondary battery of the present invention has pores in the primary particles of negative electrode active material, and hence, even if volume of silicon or tin greatly changes due to charge and discharge reaction, the volume change can be absorbed by the pores, and, besides, since both the inner core portion and the outer peripheral portion have pores, localization of the volume change can be avoided and structural collapse can be inhibited. Further, the structural collapse can be inhibited by inhibition of extension of cracks by the pores. Moreover, the negative electrode active material and the electrically conductive agent can be firmly fixed on the collector by using as a binder a material comprising a material which cures by heat treatment. As a result, a high capacity can be attained and cycle characteristics can be improved.

Other objects, features and advantages of the invention will become apparent from the following description of the embodiments of the invention taken in conjunction with the accompanying drawings.

DETAILED DESCRIPTION OF THE INVENTION

Embodiments of the present invention will be explained in detail below.
(Negative Electrode Active Material)

The negative electrode active material comprises at least one selected from the group consisting of silicon and tin, and at least one element selected from elements which do not react with lithium. It may contain both of silicon and tin. It can contain silicon or tin, but it is preferred for obtaining high capacity that silicon is contained in an amount of not less than 10% by weight and tin is contained in an amount of not less than 35% by weight with respect to the weight of the negative electrode active material. In case both of silicon and tin are contained, it is preferred that the total weight of silicon and tin is not less than 10% by weight. If it is 95% by weight or more, the amount of the component which contributes to maintenance of structure decreases, that is not preferred. Furthermore, content of tin is preferably not more than 85% by weight. When the content of tin is not more than 85% by weight, the pores can be maintained even after the heat treatment (curing treatment) necessary for curing the binder is conducted at high temperatures (300° C. or higher), and the heat treatment can be performed in a short time, that is preferred. By carrying out the heat treatment at 200° C. or lower the pores can be maintained even after the heat treatment if the content of tin is not more than 95% by weight.

As the elements which do not react with lithium, there may be used those which do not utterly react with lithium, and there may also be used those which are inferior to silicon and tin in reactivity with lithium. The elements which do not react with lithium are preferably high in electrical conductivity, and are preferably transition metal elements. As these elements, mention may be made of, for example, vanadium, chromium, manganese, iron, cobalt, nickel, copper, zinc, silver, gold, indium, titanium, and zirconium. Especially preferred are iron, nickel, copper, cobalt, manganese, silver and gold which are high in electrical conductivity.

The average particle diameter of primary particles of the negative electrode active material is preferably not more than 50 μm. If it is larger than 50 μm, absolute quantity of volume change caused by charging and discharging is great, that is not preferred. If it is not less than 0.1 μm, specific surface area does not become too large and occurrence of side reactions with electrolyte can be inhibited, that is preferred. Here, the primary particles are continuous solids, for example, polycrystals which are bonded through metallic bonding, and powder particles which merely agglomerate by van der Waals force are defined to be secondary particles. Laminates obtained by vapor phase deposition method or gas deposition method are not included in the primary particles. The average particle diameter is a value of mode diameter measured in the following manner. The negative electrode active material is separated from negative electrode, ultrasonic wave is applied thereto to perform deagglomeration, and under this state, a mode diameter is measured by a laser diffraction type particle size distribution measuring apparatus. If the negative electrode active material cannot be separated from negative electrode, the average particle diameter is measured by observing the section of the negative electrode with a scanning electron microscope or a transmission electron microscope. An electron micrograph of the section of the negative electrode is taken, and particle diameters of the negative electrode active material observed in an optional area in the photograph is measured, and an average of the diameters is obtained as an average particle diameter. Desirably, the average of at least 20 particles is obtained. In case the section of the negative electrode active material is not circular, an average of maximum length and minimum length is regarded to be a particle diameter of the negative electrode active material.

Both the inner core portion and the outer peripheral portion in the primary particles of the negative active material have pores. The shape of the pores is not particularly limited, and includes, for example, spherical, columnar, conical, cubic and rectangular shapes. The inner core portion is the inner portion of sphere having a diameter of 50% of the particle diameter of the primary particle taking the center of gravity of the primary particle as center of the sphere, and the outer peripheral portion is the portion outside the inner core portion. Since the inner core portion and the outer peripheral portion of the primary particles have pores, the volume change of the negative electrode active material can be uniformly controlled. Moreover, it is preferred that the degree of dispersion which is a value obtained by dividing a standard deviation of distance between centers of gravity of the pores by a mean value of the distance between centers of gravity of the pores is 1 or less. When the pores are uniformly dispersed in the primary particle, extension of cracks can be inhibited. The average of distances between centers of gravity of the pores and the standard deviation of distances between centers of gravity of the pores can be obtained, for example, by taking an electron micrograph of section of the negative electrode active material and analyzing the images obtained.

When the average pore diameter is not more than 2 μm, the number of pores increases and the pores can exist evenly in the particle, and besides the number of pores inhibiting the extension of cracks increases and the structural collapse can be prevented, that is preferred. When the average pore diameter is not more than 1 μm, the number of pores further increases, and the pores exist further evenly, and moreover, the number of pores inhibiting the extension of cracks further increases, resulting in improvement of cycle characteristics, that is more preferred. On the other hand, when the average pore diameter is not more than 0.01 μm, the electrolyte does not penetrate and it may cause decrease in capacity. The average pore diameter is an (area) average equivalent circle diameter obtained by taking an electron microphotograph of section of the negative electrode active material and analyzing the images obtained.

When the average distance between pores is not more than 3 μm, extension of cracks can be further inhibited and structural collapse can be prevented, that is preferred. When it is not more than 0.01 μm, the portion comprising at least one selected from the group consisting of silicon and tin, and at least one element selected from elements which do not react with lithium becomes too small as compared with the pore diameter, and strength of the primary particles of the negative electrode active material decreases, that is not preferred. The average distance between pores is a value obtained by subtracting the average pore diameter from the average distance between centers of gravity of the pores.

The porosity is preferably not less than 5%. When the porosity is not less than 5%, volume change caused by charging and discharging can be reduced. If it exceeds 80%, strength decreases, and cycle characteristics tend to deteriorate. The porosity is a proportion of area occupied by the pores in an electron micrograph of the section of the negative electrode active material.

(Binder)

As a binder, there is used one containing a material which cures by heat treatment. When the binder contains a material which cures by heat treatment, the negative electrode active material and an electrically conductive agent can be firmly fixed on the collector. The heating temperature is not particularly limited, and preferred is a material which cures by a heat treatment at 150° C. or higher. For example, the material which cures by heat treatment is a material containing an imide compound. When the binder is a material containing an imide compound, adhesion between the negative electrode active material and the electrically conductive agent and between the negative electrode mix layer and the collector is improved. The binder may be a material containing an imide compound, but it is preferred to prepare the binder by heat treating a polyimide or polyamic acid. Moreover, a polyamideimide or the like may also be used.

(Production Process)

A melt quenching method can be used for producing the negative electrode active material. By using the melt quenching method, the crystallite diameter can be made fine. As the melt quenching method, mention may be made of, for example, single-roll method, twin-roll method, centrifugal method (vertical type), centrifugal method (horizontal type), single-roll method with planetary roll, gun method, piston•anvil method, torsion•catapult method, in-water jet spinning method, in-rotating liquid spinning method, glass-coating spinning method, gas atomizing method, and water atomizing method. It is more preferred to use a single-roll method which provides high quenching speed, because the crystallite diameter becomes finer. Moreover, this method is preferred also from the viewpoint that the quenching speed differs at the side which contacts with a cooling substrate and the side which does not contact with cooling substrate, and temperature gradient occurs during cooling, whereby pores are formed.

The negative electrode can be made by kneading a negative electrode active material, an electrically conductive agent and a binder or a binder precursor, slurrifying the mixture with addition of a solvent, coating the slurry on a collector, and heating it to cure the binder. When the binder contains an imide compound, the negative electrode can be made by kneading a negative electrode active material, an electrically conductive agent, polyimide or polyamic acid as a precursor, slurrifying the mixture with addition of a solvent, coating the slurry on a collector and heat treating it at a temperature at which the polyimide or polyamic acid are imidated. The heat treatment is preferably carried out in an inert atmosphere such as vacuum atmosphere or argon atmosphere in order to avoid oxidation of the collector. It is a matter of course that as far as the negative electrode has a negative electrode active material comprising at least one selected from the group consisting of silicon and tin, and at least one element selected from elements which do not react with lithium and having pores in both of the inner core portion and the outer peripheral portion in the primary particles, other negative electrode active materials such as, for example, carbon negative electrode active material may be contained.

The heat treating temperature is not particularly limited, and is preferably not lower than 150° C. When the heat treating temperature is not higher than 200° C., even if the tin content of the negative electrode active material comprising tin and at least one element selected from elements which do not react with lithium and having pores in both of the inner core portion and the outer peripheral portion in the primary particles is more than 85% by weight, the pores can be maintained even after the heat treatment, that is preferred. It is a matter of course that even if the tin content is not more than 85% by weight, the heat treatment may be carried out at 200° C. or lower. Furthermore, since the heat treating time can be shortened by raising the heat treating temperature, the heat treatment is carried out preferably at higher than 200° C. when the tin content is 85% by weight or less.

(Secondary Battery)

A non-aqueous secondary battery of high capacity and long life can be produced by using the negative electrode for non-aqueous secondary batter of the present invention.

DESCRIPTION OF PREFERRED EMBODIMENTS

Examples of the present invention will be explained in detail below. These examples should not be construed as limiting the invention in any manner.

(Preparatory Experiment)

Figure 2:
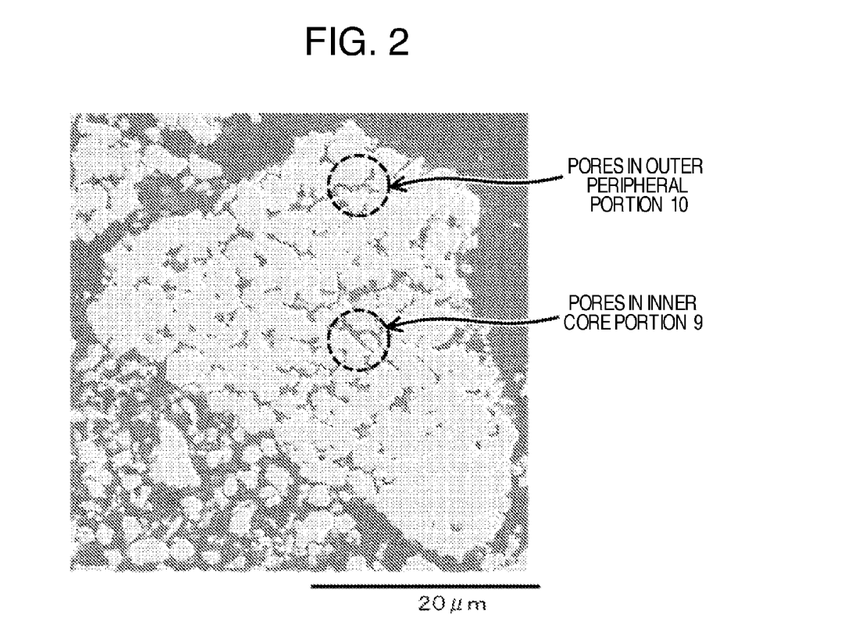
FIG. 2 is a scanning electron micrograph of powders after subjected to the heat treated in the preparatory experiment.
Figure 3:
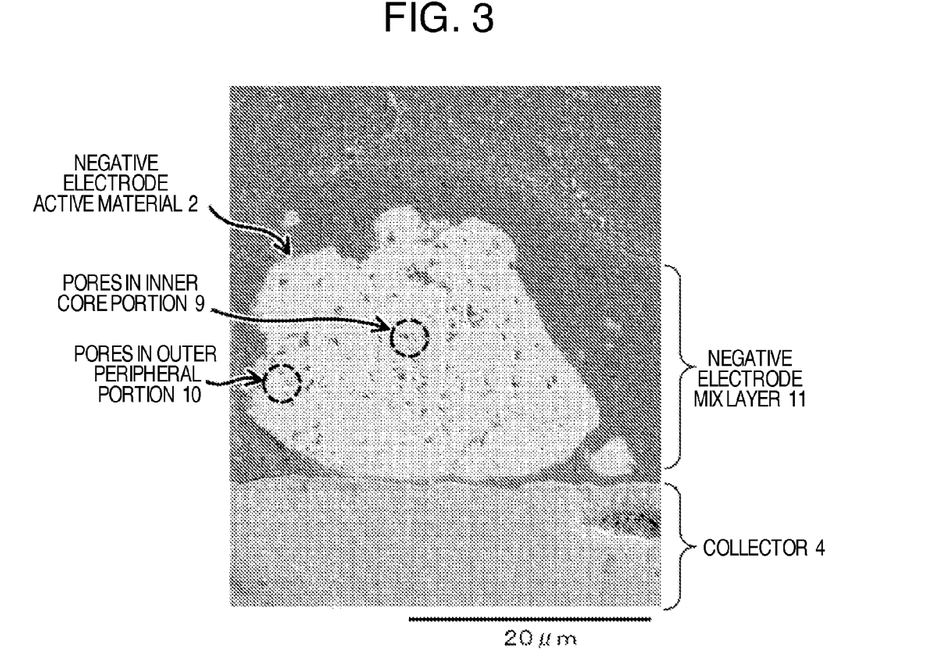
FIG. 3 is a scanning electron micrograph obtained in Example 1.
Figure 4:
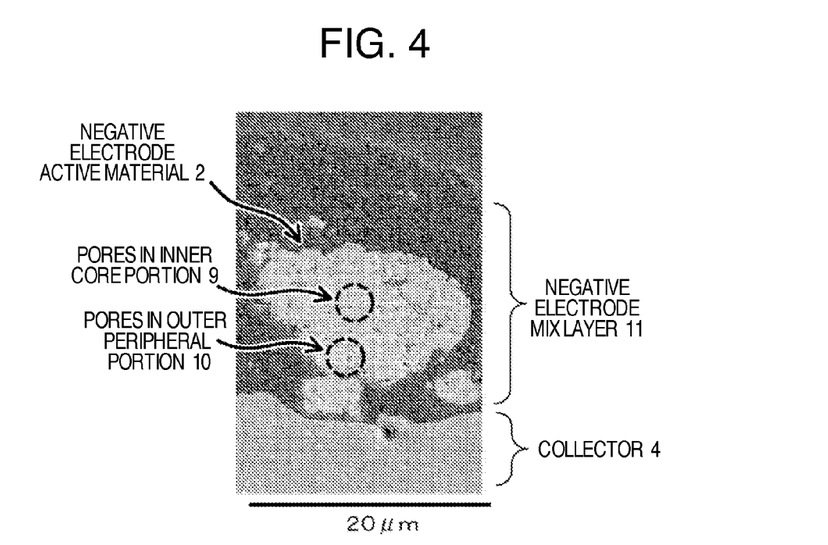
FIG. 4 is a scanning electron micrograph obtained in Example 2.
Figure 5:
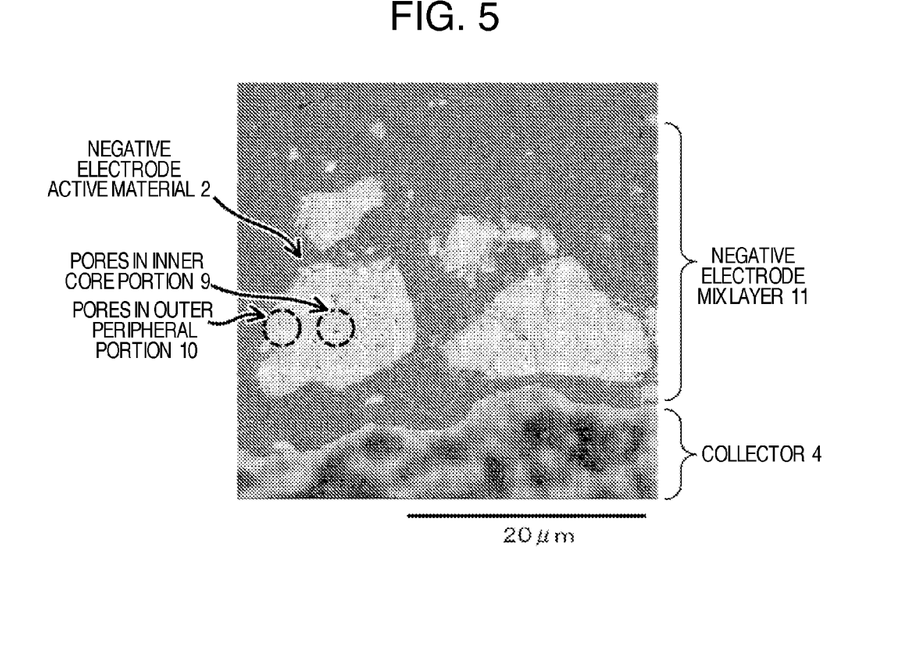
FIG. 5 is a scanning electron micrograph obtained in Example 3.
Figure 6:
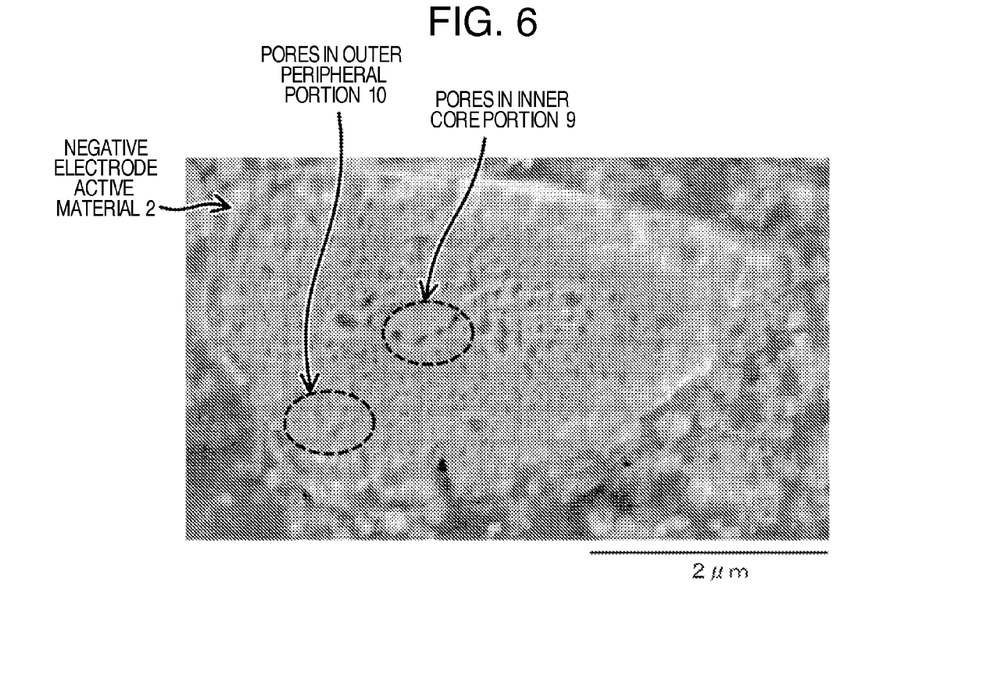
FIG. 6 is a scanning electron micrograph obtained in Example 4.

An alloy was obtained by mixing 80 parts by weight of tin and 20 parts by weight of cobalt and melting the mixture by arc melting process in an argon atmosphere, followed by cooling. The resulting alloy was ground to a size of 5 mm-10 mm square, followed by melting by high-frequency heating process in an argon atmosphere and quenching by single-roll method to obtain a quenched alloy in the form of a ribbon. Elemental analysis of the resulting quenched alloy was conducted by an energy dispersive X-ray fluorescence analytic instrument (EDX) to find that it comprised 83% by weight of tin and 17% by weight of cobalt. This quenched alloy in the form of ribbon was ground by a metallic mortar and the particles were classified by passing them through a sieve having a sieve opening of 45 μm to obtain powders having pores in both the inner core portion and the outer peripheral portion in the primary particles. The powders were heat treated at 300° C. for 1 hour in a vacuum. The section of the powders after subjected to heat treatment was observed by a scanning electron microscope (SEM). The results are shown in FIG. 2. It was confirmed that as shown in FIG. 2, when the content of tin was 83% by weight, the pores were maintained in both the inner core portion and the outer peripheral portion of the primary particles even after subjected to the heat treatment.

Example 1

An alloy was obtained by mixing 80 parts by weight of tin and 20 parts by weight of cobalt and melting the mixture by arc melting process in an argon atmosphere, followed by cooling. The resulting alloy was ground to a size of 5 mm-10 mm square, followed by adding boron, melting by high-frequency heating process in an argon atmosphere and quenching by single-roll method to obtain a quenched alloy in the form of ribbon. Elemental analysis of the resulting quenched alloy was conducted by EDX, and the results are shown in Table 1. This quenched alloy in the form of ribbon was ground by a metallic mortar and were classified by passing through a sieve having a sieve opening of 45 μM to obtain a negative electrode active material. The average particle diameter of the negative electrode active material was measured by a laser diffraction type particle size distribution measuring apparatus (LA-920 manufactured by Horiba Ltd). The results are shown in Table 1.

A slurry was prepared by kneading 66 parts by weight of the resulting negative electrode active material, 17 parts by weight of acetylene black as an electrically conductive agent and a solution prepared by dissolving 17 parts by weight of polyamic acid as a binder precursor in N-methylpyrrolidone. The slurry obtained was uniformly coated on a copper foil by a coater. The foil was dried at 80° C. in the air, and then punched out in a circle of φ 16 mm, followed by pressing and heat treating at 300° C. for 1 hour in a vacuum to obtain a negative electrode.

An SEM photograph of the section of the negative electrode active material in the negative electrode was analyzed by an image analysis software ("Azo kun" manufacture by Asahi Kasei Engineering Co., Ltd.) to obtain porosity, average pore diameter, degree of dispersion and distance between pores. As a result, the porosity was 9.4%, the average pore diameter (equivalent circle diameter) was 0.99 μm, the degree of dispersion was 0.54, and the average distance between pores was 1.1 μm.

Example 2

A negative electrode active material was prepared in the same manner as in Example 1, except that the quenched alloy in the form of ribbon was ground by a planetary ball mill (ball diameter: ϕ 15 mm). The results of measurement of average particle diameter of the resulting negative electrode active material are shown in Table 1. Moreover, a negative electrode was made in the same manner as in Example 1, except that the negative electrode active material obtained here was used.

Example 3

A negative electrode active material was prepared in the same manner as in Example 1, except that the quenched alloy in the form of ribbon was ground by a planetary ball mill (ball diameter: ϕ 5 mm). The results of measurement of average particle diameter of the resulting negative electrode active material are shown in Table 1. Moreover, a negative electrode was made in the same manner as in Example 1, except that the negative electrode active material obtained here was used.

Example 4

A quenched alloy in the form of ribbon was prepared in the same manner as in Example 1, except that the content of tin was increased. Elemental analysis of the resulting quenched alloy was conducted by EDX, and the results are shown in Table 1. The quenched alloy in the form of ribbon was ground by a planetary ball mill (ball diameter: ϕ 5 mm), and the particles were classified by passing through a sieve having a sieve opening of 45 μm to obtain a negative electrode active material. The results of measurement of average particle diameter of the resulting negative electrode active material are shown in Table 1.

A slurry was prepared by kneading 66 parts by weight of the resulting negative electrode active material, 17 parts by weight of acetylene black as an electrically conductive agent and a solution prepared by dissolving 17 parts by weight of polyamic acid as a binder precursor in N-methylpyrrolidone. The slurry obtained was uniformly coated on a copper foil by a coater. The foil was dried at 80° C. in the air, and then punched out in a circle of ϕ 16 mm, followed by pressing and heat treating at 200° C. for 3 hours in a vacuum to obtain a negative electrode.

Comparative Example 1

A quenched alloy in the form of ribbon was prepared in the same manner as in Example 4. The resulting quenched alloy was subjected to elemental analysis by EDX, and the results are shown in Table 1. Further, a negative electrode active material was prepared in the same manner as in Example 1, except that the quenched alloy obtained above was used. The results of measurement of average particle diameter of the resulting negative electrode active material are shown in Table 1. A negative electrode was made in the same manner as in Example 1, except that the negative electrode active material obtained here was used.

Comparative Example 2

An alloy was obtained by mixing 80 parts by weight of tin and 20 parts by weight of cobalt and melting the mixture by arc melting process in an argon atmosphere, followed by cooling. The resulting alloy was ground by a metallic mortar and the particles were classified by passing through a sieve having a sieve opening of 45 μm to obtain a negative electrode active material. The average particle diameter of the negative electrode active material was measured. The results are shown in Table 1. A negative electrode was made using the resulting negative electrode active material in the same manner as in Example 1.

Comparative Example 3

A negative electrode active material was prepared in the same manner as in Comparative Example 2, and a slurry was prepared by kneading 66 parts by weight of the resulting negative electrode active material, 17 parts by weight of acetylene black as an electrically conductive agent and a solution prepared by dissolving 17 parts by weight of polyvinylidene fluoride (PVDF) as a binder in N-methylpyrrolidone. The slurry obtained was uniformly coated on a copper foil by a coater. The foil was dried at 80° C. in the air, and then punched out in a circle of ϕ 16 mm, followed by pressing and then heat treating at 120° C. for 3 hours in a vacuum to obtain a negative electrode.

Figure 8:
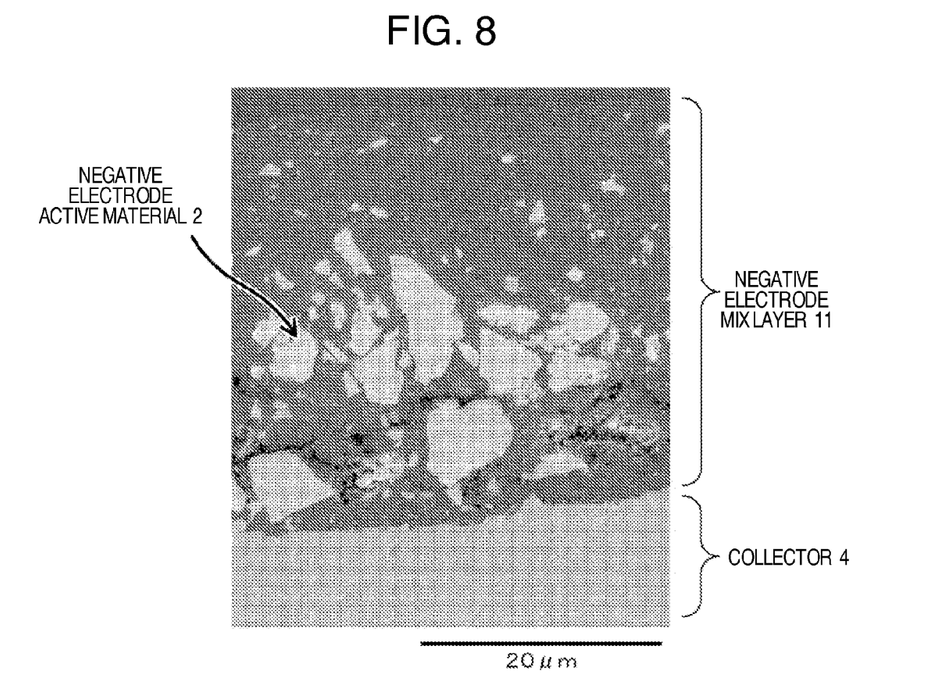
FIG. 8 is a scanning electron micrograph obtained in Comparative Example 2.
Figure 9:
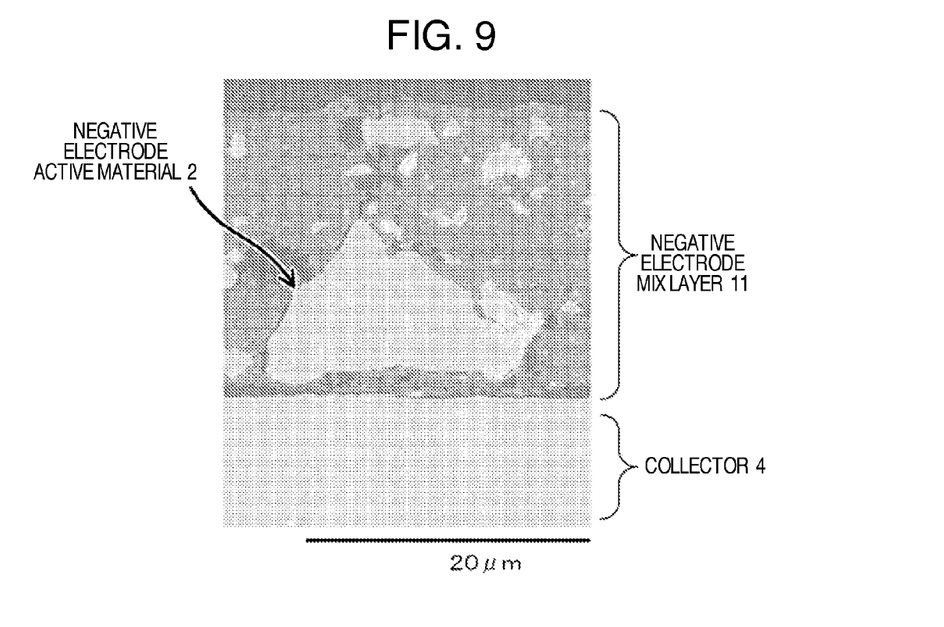
FIG. 9 is a scanning electron micrograph obtained in Comparative Example 3.
Figure 10:
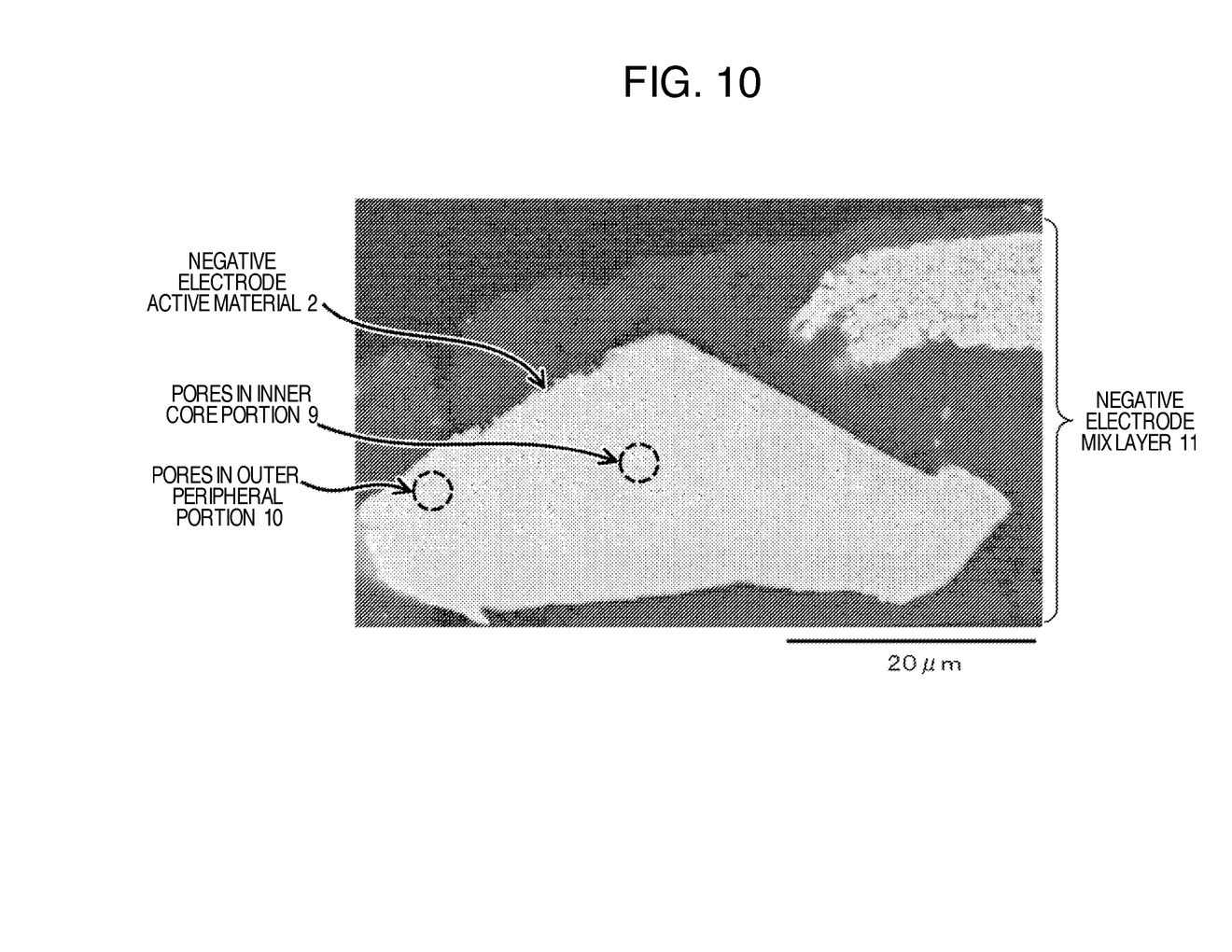
FIG. 10 is a scanning electron micrograph of the section of powders before subjected to the heat treatment in Comparative Example 1.
Figure 11:
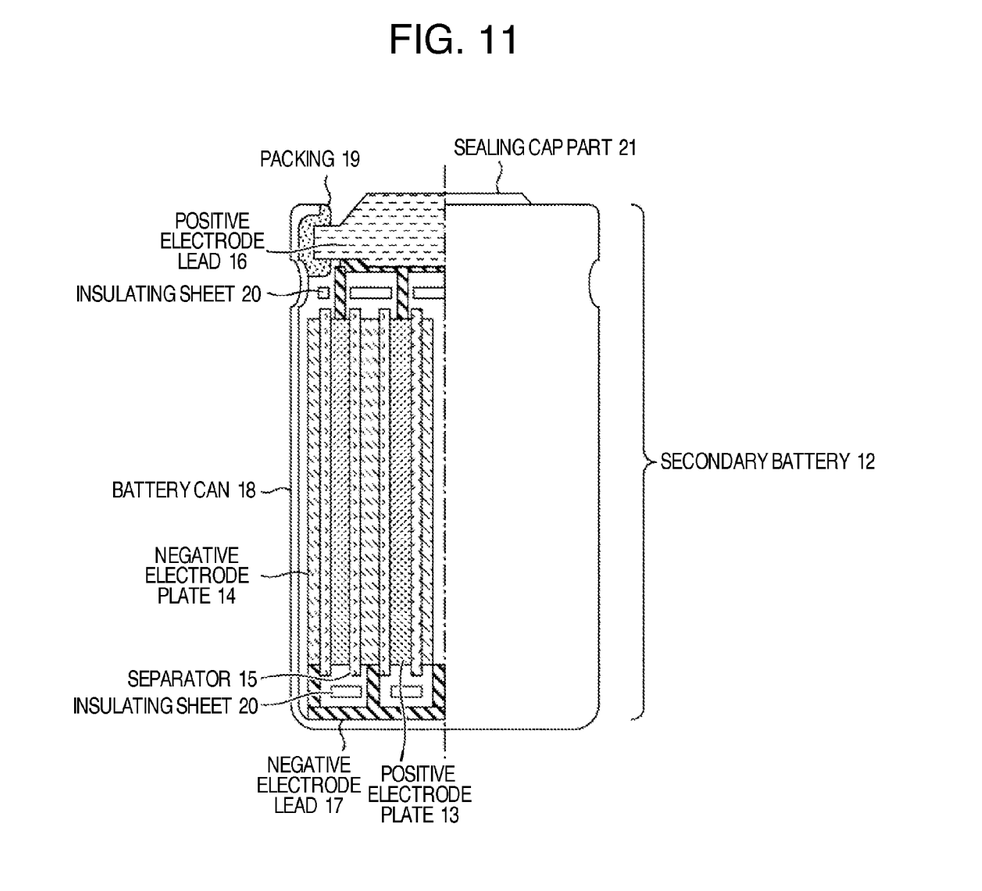
FIG. 11 is a schematic view of the non-aqueous secondary battery of the present invention.

The section of the negative electrodes obtained in Examples 1-4 and Comparative Examples 1-3 was observed by SEM, and the results are shown in FIG. 3-FIG. 9. Further, the section of the negative electrode of Comparative Example 1 before heat treated at 300° C. for 1 hour in a vacuum was observed by SEM, and the results are shown in FIG. 10.

Figure 7:
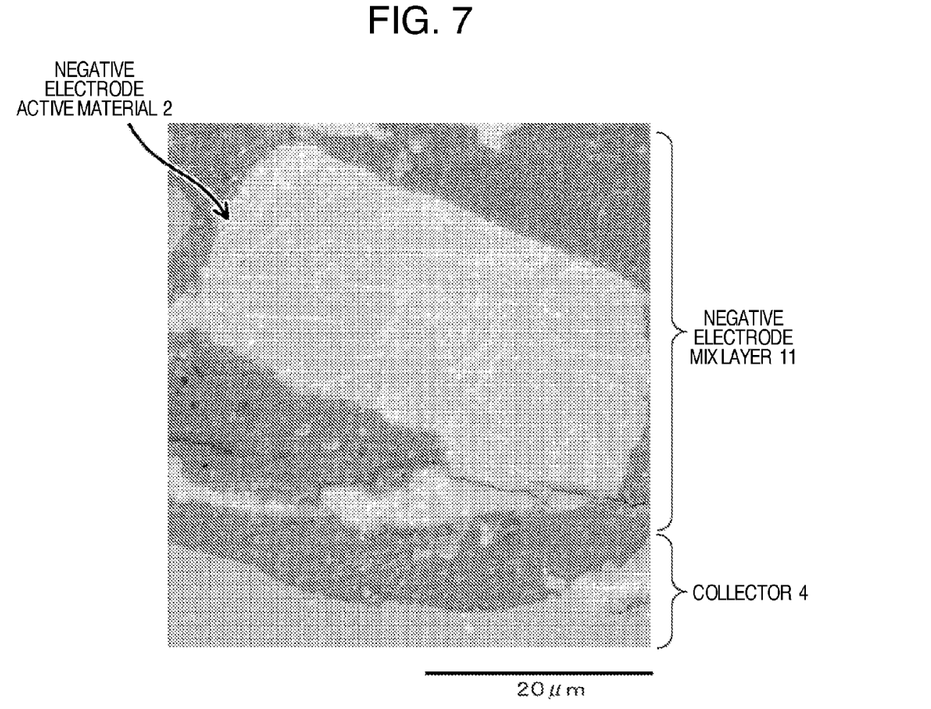
FIG. 7 is a scanning electron micrograph obtained in Comparative Example 1.

As shown in FIG. 3-FIG. 6, it can be seen that both of the inner core portion and the outer peripheral portion in primary particles of the negative electrode active material in Examples 1-4 had pores. On the other hand, as shown in FIG. 7-FIG. 9, it can be seen that the negative electrode active materials of negative electrodes of Comparative Examples 1-3 did not have pores. Furthermore, as shown in FIG. 7 and FIG. 10, it can be seen that pores in the negative electrode active material of the negative electrode of Comparative Example 1 disappeared by the heat treatment. Moreover, it can be seen that the negative electrodes of Example 4 and Comparative Example 1 were made from the same quenched alloy, and when the heat treating conditions were 300° C. and 1 hour, the pores disappeared while when the heat treating conditions were 200° C. and 3 hours, the pores were maintained.

TABLE 1

| | Composition | | Average particle diameter (mode diameter) (μm) | Pores | Binder |
|---|---|---|---|---|---|
| | Tin (wt %) | Cobalt (wt %) | | | |
| Example 1 | 77 | 23 | 36.9 | Present | Imide compound |
| Example 2 | 77 | 23 | 27.7 | Present | Imide compound |
| Example 3 | 77 | 23 | 12.4 | Present | Imide compound |
| Example 4 | 93 | 7 | 13.25 | Present | Imide compound |
| Comparative Example 1 | 93 | 7 | 31.5 | Absent | Imide compound |
| Comparative Example 2 | 79 | 21 | 8.2 | Absent | Imide compound |
| Comparative Example 3 | 79 | 21 | 8.2 | Absent | PVDF |

(Evaluation of Electrode Characteristics)

Electrode characteristics of the negative electrodes of Examples 1-3 and Comparative Examples 1-3 were evaluated. As electrolyte, there was used a solution prepared by adding 1 M LiPF$_6$ to a mixed solvent of ethylene carbonate, dimethyl carbonate and ethyl methyl carbonate to which vinylene carbonate was added. Lithium metal was used for counter electrode.

The charge and discharge test was conducted by carrying out constant current and constant voltage charging until reaching 0.01 V (vs. Li/Li$^+$), and constant current discharging until reaching 2V (vs. Li/Li$^+$). Discharge capacity and capacity retention rate after 5 cycles and 30 cycles are shown in Table 2. When the capacity retention rate exceeded 100%, this is noted to be "100%".

TABLE 2

|  | Discharge capacity (Ah/kg) | Capacity retention rate (%) | |
|---|---|---|---|
|  |  | After 5 cycles | After 30 cycles |
| Example 1 | 606 | 96 | 93 |
| Example 2 | 714 | 94 | 89 |
| Example 3 | 767 | 96 | 100 |
| Example 4 | 590 | 100 | 100 |
| Comparative Example 1 | 837 | 82 | — |
| Comparative Example 2 | 445 | 100 | 100 |
| Comparative Example 3 | 423 | 63 | — |

As shown in Table 2, the negative electrodes of examples 1-4 made by using negative electrode active materials having pores in both the inner core portion and the outer peripheral portion and using, as binders, the materials containing imide compound which cured by the heat treatment showed a high discharge capacity of 590-767 Ah/kg which was about twice the discharge capacity of the negative electrodes made using carbon materials. Further, the capacity retention rate was 94% or higher after 5 cycles, and 89% or higher after 30 cycles. Thus, they were superior also in cycle characteristics.

Moreover, as shown in the preparatory experiment, the powders containing 83% by weight of tin and having pores in both of the inner core portion and the outer peripheral portion in the primary particles retained the pores even after the heat treatment (curing treatment) at 300° C. for 1 hour, and it can be considered in view of the results of Examples 1-3 that high capacity and satisfactory cycle characteristics can be obtained when the content of tin is not more than 85% by weight.

Further, from the results of Example 4, it can be considered that by carrying out the heat treatment (curing treatment) at 200° C. or lower, when the content of tin in the negative electrode active material comprising tin and at least one element selected from elements which do not react with lithium and having pores in both of the inner core portion and the outer peripheral portion in the primary particles is not more than 95% by weight, the pores are retained, and high capacity and satisfactory cycle characteristics can be obtained.

On the other hand, the negative electrode of Comparative Example 1 which was made using, as a binder, the material containing imide compound which cured by the heat treatment and in which the pores in the negative electrode active material disappeared by the heat treatment had a high capacity, but was inferior in cycle characteristics, namely, had a capacity retention rate of 82% after 5 cycles. That is, it can be seen that even if the binder is a material containing imide compound which cures by the heat treatment, when the content of tin in the negative electrode active material is high, namely, 93% and the melting point is low, the pores disappear by the heat treatment (curing treatment) at 300° C., and the cycle characteristics are inferior.

Furthermore, the negative electrode of Comparative Example 2 which was made using, as a binder, the material containing imide compound which cured by the heat treatment and in which the negative electrode active material was prepared by arc melting process and there were no pores in the primary particles of the negative electrode active material had good cycle characteristics, namely, had a capacity retention rate of 100% after 30 cycles, but was low in discharge capacity, namely, 445 Ah/kg. That is, it can be seen that even if the negative electrode active material is prepared using, as a binder, a material containing imide compound which cures by the heat treatment, is low in tin content, namely, 79% by weight, is high in melting point and is not affected by the heat treatment (curing treatment), the capacity of the negative electrode becomes low if the negative electrode active material used does not have pores.

Furthermore, the negative electrode of Comparative Example 3 which was made using a negative electrode active material prepared by arc melting process, having no pores in the primary particles, and prepared using thermoplastic PVDF as a binder was low in discharge capacity, namely, 423 Ah/kg and had a low capacity retention rate of 63% after 5 cycles, namely, was inferior in cycle characteristics.

As mentioned above, it can be seen that both the high capacity and the satisfactory cycle characteristics can be simultaneously attained by using a negative electrode active material in which both of the inner core portion and the outer peripheral portion have pores in the primary particles and which is prepared by using a binder containing a material which cures by a heat treatment. That is, it is shown that the negative electrode of the present invention is high in capacity and is satisfactory in cycle characteristics.

The negative electrode for non-aqueous secondary batteries which is obtained by the present invention can be expected to be applied to electric sources for mobile or stationary power storage which require large lithium ion secondary batteries excellent in capacity.

It should be further understood by those skilled in the art that although the foregoing description has been made on embodiments of the invention, the invention is not limited thereto and various changes and modifications may be made without departing from the spirit of the invention and the scope of the appended claims.

DESCRIPTION OF REFERENCE NUMERALS

1: Negative electrode
2: Negative electrode active material
3: Electrically conductive agent
4: Collector
5: Binder (a material which cures by heat treatment)
6: Pore
7: Inner core portion
8: Outer peripheral portion
9: Pores in the inner core portion
10: Pores in the outer peripheral portion
11: Negative electrode mix layer
12: Secondary battery
13: Positive electrode plate
14: Negative electrode plate
15: Separator
16: Positive electrode lead
17: Negative electrode lead
18: Battery can
19: Packing
20: Insulating sheet
21: Sealing cap part

The invention claimed is:

1. A negative electrode for a non-aqueous secondary battery wherein a negative electrode active material comprises primary particles made of an alloy comprising at least one selected from the group consisting of silicon and tin, and at least one element selected from elements which do not react with lithium, and both an inner core portion and an outer peripheral portion of the primary particles have pores, and a binder contains a material which cures by a heat treatment, and
wherein a degree of dispersion of the pores which is a value obtained by dividing a standard deviation of distances between centers of gravity of the pores by an average of distances between centers of gravity of the pores is not more than 1.

2. A negative electrode for a non-aqueous secondary battery according to claim 1 wherein the binder contains an imide compound.

3. A negative electrode for a non-aqueous secondary battery according to claim 1 wherein the alloy comprises tin and the at least one element selected from the elements which do not react with lithium.

4. A negative electrode for a non-aqueous secondary battery according to claim 3 wherein a tin content in the alloy comprising tin and the at least one element selected from the elements which do not react with lithium is not more than 85% by weight.

5. A negative electrode for a non-aqueous secondary battery according to claim 1 wherein an element of the elements which do not react with lithium is vanadium, chromium, manganese, iron, cobalt, nickel, copper, zinc, silver, gold, indium, titanium or zirconium.

6. A negative electrode for a non-aqueous secondary battery according to claim 1 wherein an average pore diameter of the pores is not more than 2 μm.

7. A negative electrode for a non-aqueous secondary battery according to claim 1 wherein an average distance between the pores is not more than 3 μm.

8. A negative electrode for a non-aqueous secondary battery according to claim 1 wherein a porosity of the pores is not less than 5%.

9. A negative electrode for a non-aqueous secondary battery according to claim 1 wherein an average particle diameter of the primary particles is not more than 50 μm.

10. A negative electrode for a non-aqueous secondary battery according to claim 1 wherein the primary particles are prepared by a melt quenching method.

11. A negative electrode for a non-aqueous secondary battery according to claim 1 wherein the primary particles are prepared by a single-roll method.

12. A negative electrode for a non-aqueous secondary battery according to claim 1 wherein the heat treatment temperature is not higher than 200° C.

13. A non-aqueous secondary battery which comprises a positive electrode, a negative electrode, a separator and an electrolyte, the negative electrode being the negative electrode for the non-aqueous secondary battery according to claim 1.

14. A negative electrode for a non-aqueous secondary battery comprising:
a negative electrode active material comprising primary particles made of an alloy, the alloy comprising at least one selected from the group consisting of silicon and tin, and at least one element selected from elements which do not react with lithium, wherein both an inner core portion and an outer peripheral portion of the primary particles comprise pores; and
a binder comprising a material which cures by a heat treatment,
wherein a degree of dispersion of the pores which is a value obtained by dividing a standard deviation of distances between centers of gravity of the pores by an average of distances between centers of gravity of the pores is not more than 1.

15. A negative electrode for a non-aqueous secondary battery according to claim 14 wherein the binder contains an imide compound.

16. A negative electrode for a non-aqueous secondary battery according to claim 14 wherein the alloy comprises tin and the at least one element selected from the elements which do not react with lithium.

17. A negative electrode for a non-aqueous secondary battery according to claim 16 wherein a tin content is not more than 85% by weight.

* * * * *